(12) United States Patent
Huang et al.

(10) Patent No.: US 11,262,801 B2
(45) Date of Patent: Mar. 1, 2022

(54) PORTABLE ELECTRONIC DEVICE

(71) Applicant: Acer Incorporated, New Taipei (TW)

(72) Inventors: Yi-Ta Huang, New Taipei (TW);
Wu-Chen Lee, New Taipei (TW);
Cheng-Nan Ling, New Taipei (TW);
Wen-Chieh Tai, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/068,830

(22) Filed: Oct. 13, 2020

(65) Prior Publication Data

US 2021/0286404 A1 Sep. 16, 2021

(30) Foreign Application Priority Data

Mar. 10, 2020 (TW) .................................. 109107883

(51) Int. Cl.
*G06F 1/16* (2006.01)

(52) U.S. Cl.
CPC ............ *G06F 1/165* (2013.01); *G06F 1/1641* (2013.01)

(58) Field of Classification Search
CPC ................................ G06F 1/165; G06F 1/1641
See application file for complete search history.

(56) References Cited

U.S. PATENT DOCUMENTS

| 9,632,529 | B2* | 4/2017 | Tseng | G06F 1/1637 |
| 2017/0090522 | A1* | 3/2017 | Lu | G06F 1/1679 |
| 2020/0081498 | A1* | 3/2020 | Chang | G06F 1/1616 |

FOREIGN PATENT DOCUMENTS

| TW | M429297 | 5/2012 |
| TW | I502315 | 10/2015 |
| TW | I510167 | 11/2015 |
| TW | M568992 | 10/2018 |
| TW | 202009638 | 3/2020 |

* cited by examiner

*Primary Examiner* — Rockshana D Chowdhury
(74) *Attorney, Agent, or Firm* — JCIPRNET

(57) ABSTRACT

A portable electronic device includes a first body, a second body, a third body, and a support member. The second body is pivotally connected between the first body and the third body. The support member is movably disposed at the first body, and the support member is pivotally connected to one of the second body and the third body. In a folded state, the second body is folded and covered between the first body and the third body. In an unfolded state, the second body and the third body are respectively inclined relative to the first body and the second body, and the second body is suspended over the first body.

9 Claims, 9 Drawing Sheets

PORTABLE ELECTRONIC DEVICE

CROSS-REFERENCE TO RELATED APPLICATION

This application claims the priority benefit of Taiwan patent application serial no. 109107883, filed on Mar. 10, 2020. The entirety of the above-mentioned patent application is hereby incorporated by reference here and made a part of this specification.

BACKGROUND

Technical Field

The disclosure relates to a portable electronic device.

Description of Related Art

With the advancement of science and technology, computer devices have been widely used, and the price of peripheral equipment has gradually become more cost-effective. Hence, multi-functional equipment has become an important development. For instance, given said multi-functional requirements for a notebook computer, another screen in addition to the original screen is also disposed at a body of an electronic device on a host side for users to operate or use the notebook computer.

However, from the perspective of the users, the screen on the host side may have different operating angles due to different usage requirements, so that it is difficult to perform actions on the fixed screen coplanar with the host. However, if the fixed screen is changed to a movable screen, the way to operate the screen and whether the support mechanical strength is sufficient should be taken into consideration. As a matter of fact, the existing multi-screen notebook computers do not meet the above requirements.

SUMMARY

The disclosure provides a portable electronic device having a multi-pivot support structure composed of a sliding linkage rod and a multi-unit body, so as to distribute torsional load of the pivots.

In an embodiment of the disclosure, a portable electronic device including a first body, a second body, a third body, and a support member is provided. The second body is pivotally connected between the first body and the third body. The support member is movably disposed at the first body, and the support member is pivotally connected to one of the second body and the third body. In a folded state, the second body is folded and covered between the first body and the third body. In an unfolded state, the second body and the third body are respectively inclined relative to the first body and the second body, and the second body is suspended over the first body.

In view of the foregoing, the portable electronic device provided in one or more embodiments of the disclosure has a multi-unit structure composed of its first body, second body, and third body pivotally connected to each other, and the supported member is movably disposed at the first body and pivotally connected to the second body or the third body as a support. Thereby, the multi-unit structure not only has the components pivotally rotated relative to each other but also has the improved support force required for operation through the support member. In other words, when the first body, the second body, and the third body are pivotally connected without any support member, the weight of the second body and the third body complete becomes the load of pivoting axles during pivotal rotation, which is apparently not conducive to the life span of the pivots; by contrast, when the support member is pivotally connected to the second body or the third body, the load of the pivoting axles may be effectively distributed to the first body through the support member, which may improve the process of pivotally rotating and folding the portable electronic device.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure

DESCRIPTION OF THE EMBODIMENTS

Figure 1:
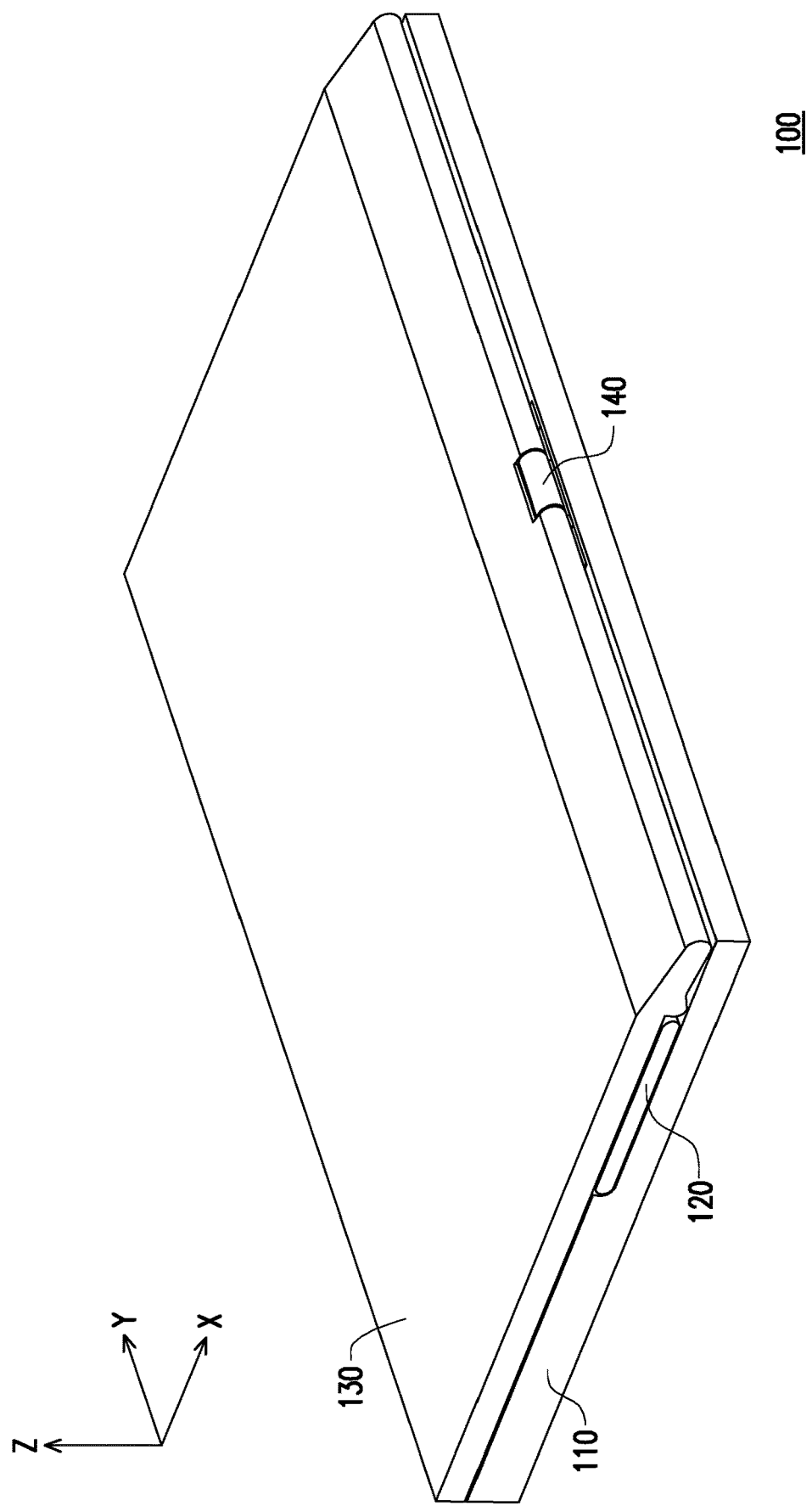
FIG. 1 is a schematic view of a portable electronic device according to an embodiment of the disclosure.
Figure 2A:
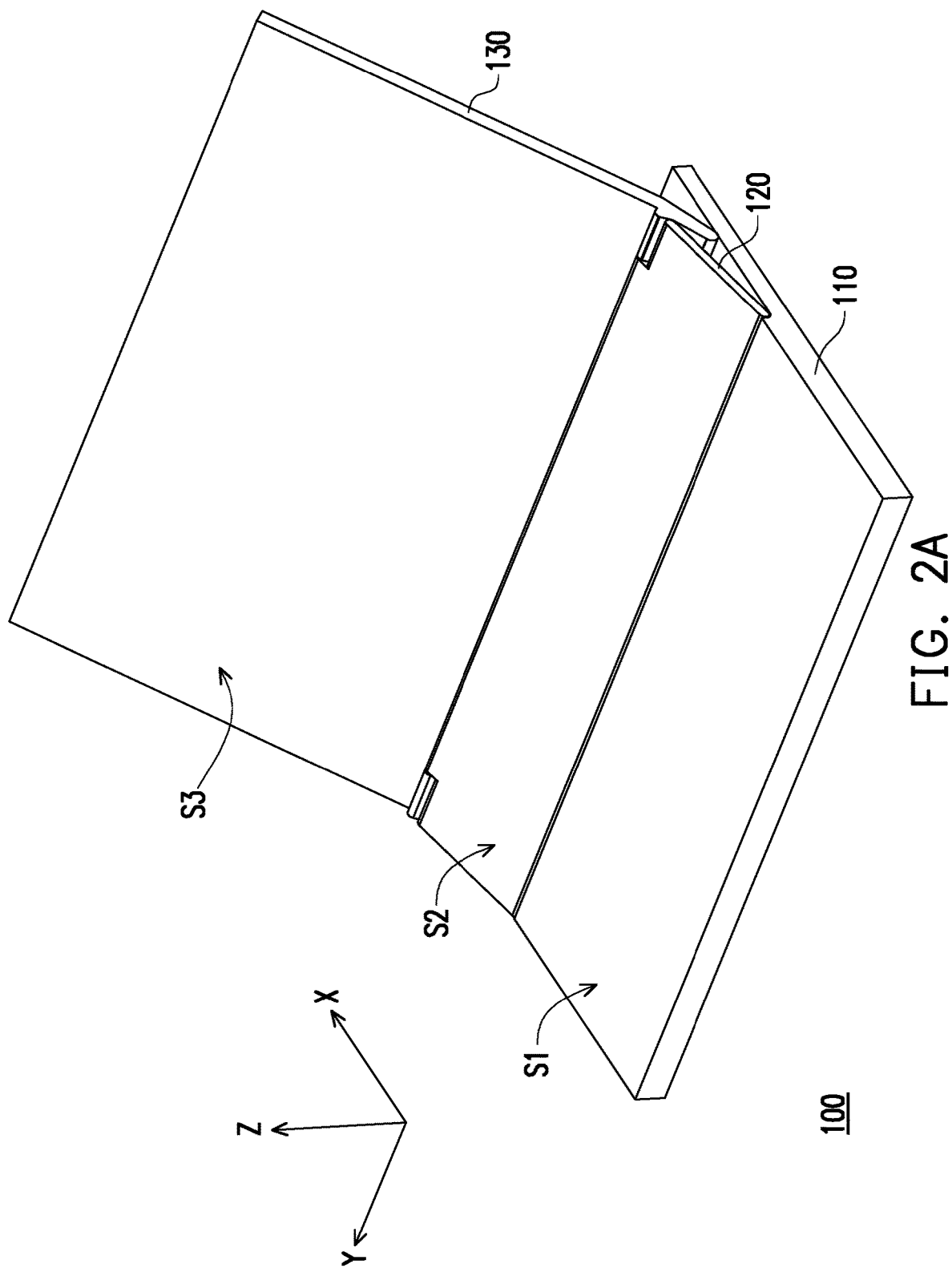
FIG. 2A and FIG. 2B illustrate the portable electronic device in FIG. 1 in another state at different viewing angles, respectively.
Figure 2B:
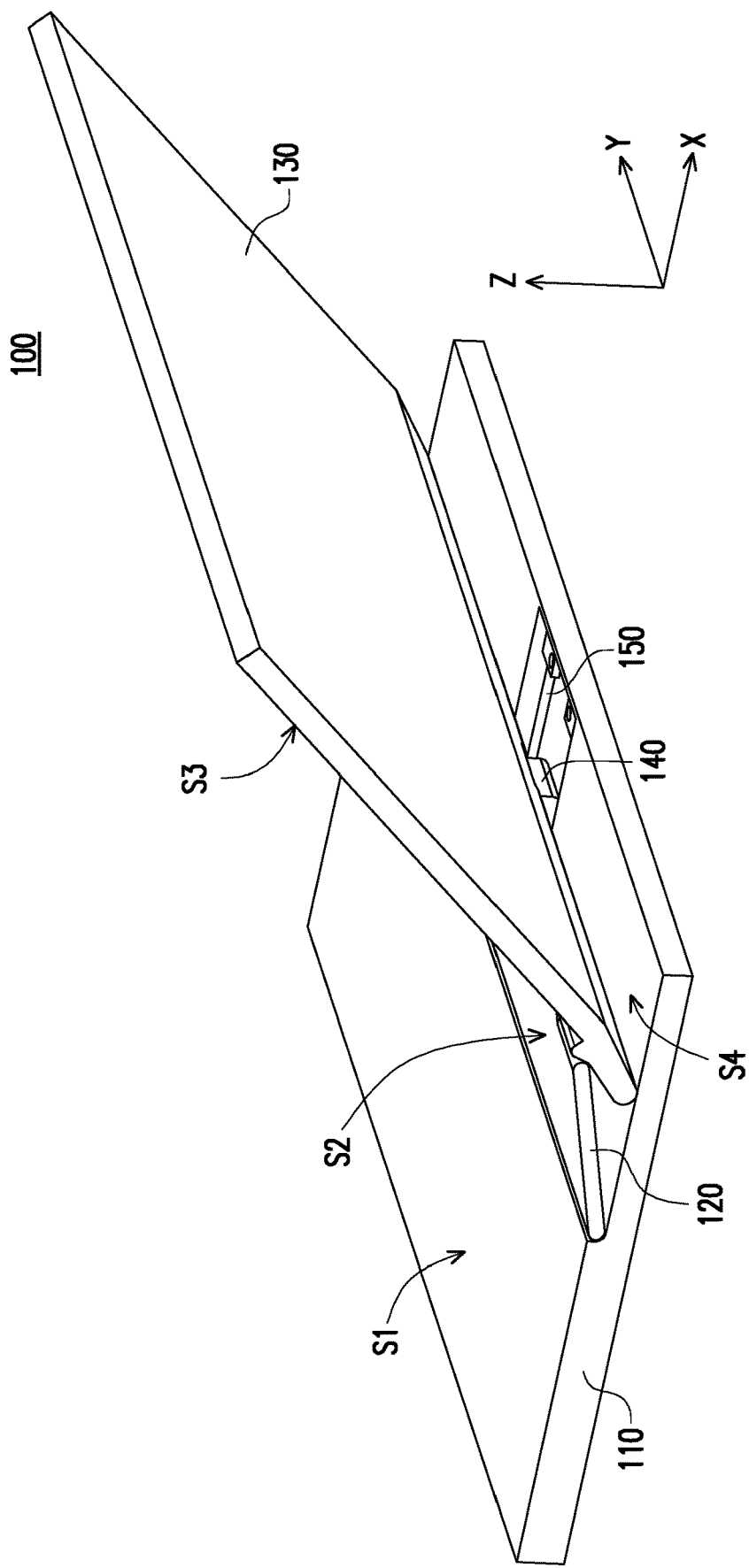

FIG. 1 is a schematic view of a portable electronic device according to an embodiment of the disclosure. FIG. 2A and FIG. 2B illustrate the portable electronic device in FIG. 1 in another state at different viewing angles, respectively. Here, rectangular coordinates X-Y-Z are provided to better describe the components. Besides, it should be mentioned that the pivoting mechanisms among the bodies of the electronic device may be known from the related art and thus will only be summarized in the description but will be omitted from the drawings.

In this embodiment, the portable electronic device 100 is, for instance, a notebook computer and includes a first body 110, a second body 120, a third body 130, and a support member 140. The second body 120 is pivotally connected between the first body 110 and the third body 130. The support member 140 is movably disposed at the first body 110, and the support member 140 is pivotally connected to one of the second body 120 and the third body 130 (the support member 140 provided in this embodiment is pivotally connected to the third body 130). In a folded state, as shown in FIG. 1, the second body 120 is folded and covered between the first body 110 and the third body 130. In an unfolded state, as shown in FIG. 2A and FIG. 2B, the second body 120 and the third body 130 are respectively inclined relative to the first body 110, and the second body 120 is suspended over the first body 110, respectively.

To be specific, the first body 110 provided in the embodiment is, for instance, a host of a notebook computer and has an input surface S1. In the embodiment, the input surface S1 may be provided with a physical input module (e.g., a physical keyboard and a touchpad) or a virtual input module (e.g., a touch screen capable of displaying virtual keys and a virtual touchpad), which should not be construed as a limitation in the disclosure. Besides, the second body 120 and the third body 130 are screens, respectively, wherein the second body 120 has a first display surface S2, and the third body 130 has a second display surface S3. The third body 130 is a known display screen of a conventional notebook computer, and the second body 120 is a display screen additionally disposed on a host side. Hence, as a secondary display screen, the area occupied by the second body 120 (i.e., the area of the first display surface S2) is substantially smaller than the area occupied by the third body 130 (i.e., the area of the second display surface S3), and the first display surface S2 substantially adjoins the input surface S1 and the second display surface S3. In addition, the second display surface S3 in the unfolded state is partially covered by the second body 120; in response thereto, the portable electronic device 100 provided in the embodiment further includes a control module (not shown) electrically connected to the second body 120 and the third body 130, and the display range of the second display surface S3 is correspondingly adjusted according to different states, i.e., the folded state and the unfolded state.

Figure 3A:
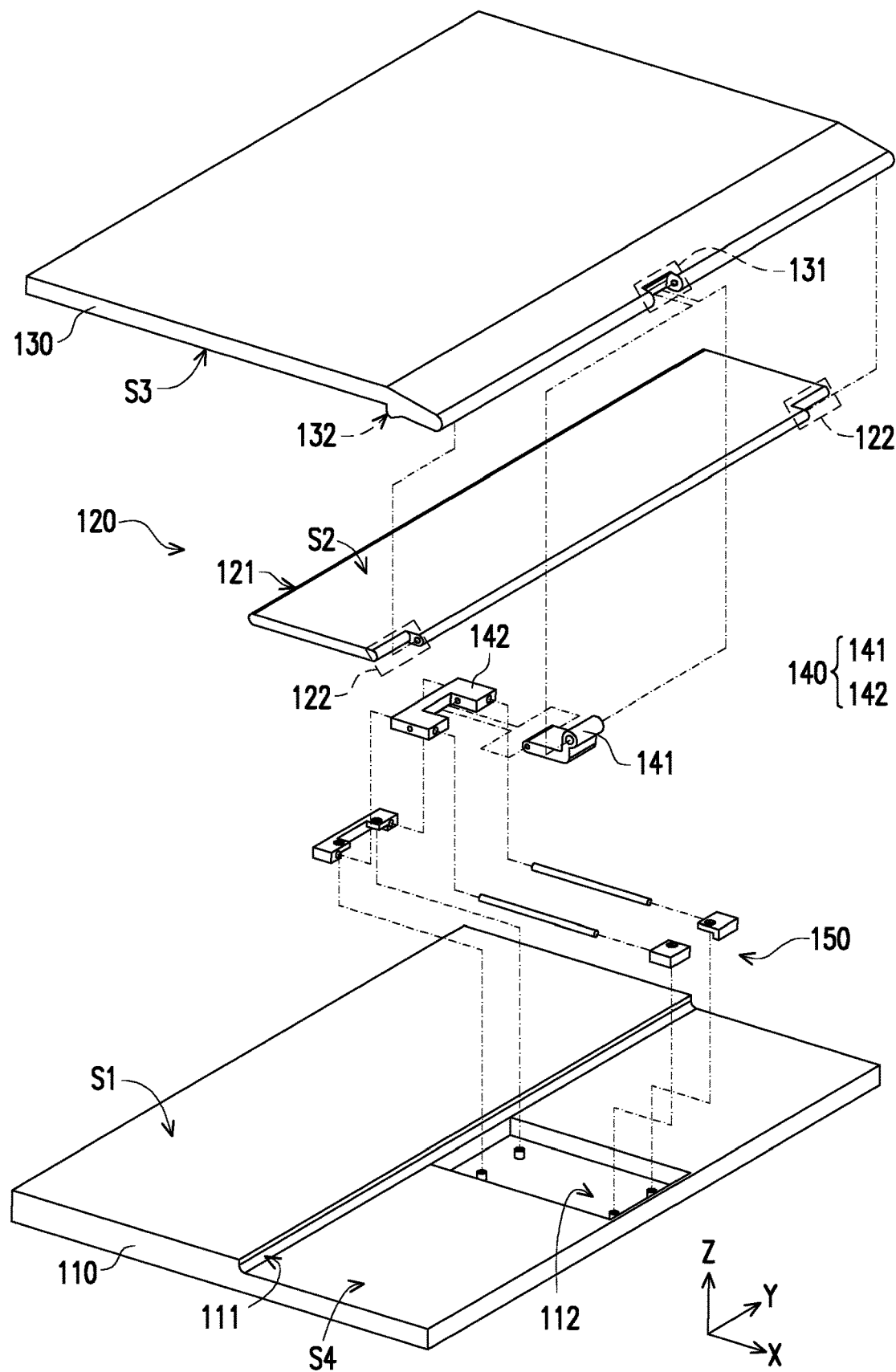
FIG. 3A and FIG. 3B are exploded views of the portable electronic device in FIG. 1 at different viewing angles, respectively.
Figure 3B:
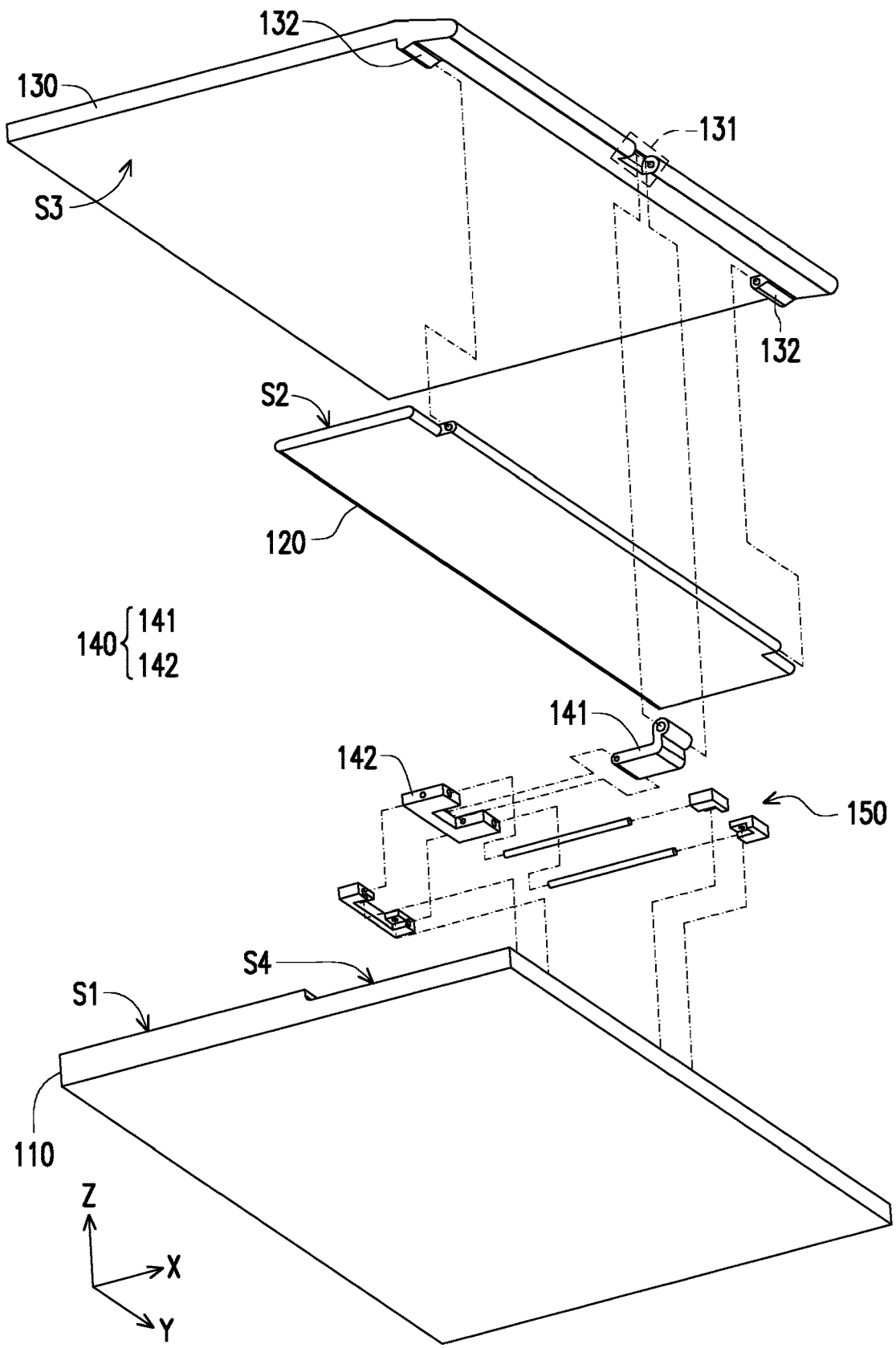

FIG. 3A and FIG. 3B are exploded views of the portable electronic device in FIG. 1 at different viewing angles, respectively. With reference to FIG. 3A and FIG. 3B, in the embodiment, the first body 110 has an accommodation region S4, and a side edge 121 of the second body 120 is substantially pivotally connected to a side edge 111 of the first body 110 located at the accommodation region S4. Besides, a pivoting portion 122 of the second body 120 is located at the opposite side of the side edge 121 and is pivotally connected to a pivoting portion 132 of the third body 130; therefore, the first body 110, the second body 120, and the third body 130 may form a three-unit pivoting structure and may be pivotally rotated as shown in FIG. 1, FIG. 2A, and FIG. 2B.

In addition, to overcome the pivotal load caused by the bodies of the electronic device, the first body 110 provided in the embodiment is also equipped with a recess 112 located at the accommodation region S4 and a rail 150 disposed in the recess 112. The rail 150 is composed of a plurality of fixing members and a pair of guiding rods. The support member 140 includes a pivoting portion 141 and a sliding block 142 assembled to each other, and the guiding rods pass through the sliding block 142, so as to allow the pivoting portion 141 to slide back and forth along the rail together with the sliding block 142. Meanwhile, another pivoting portion 131 of the third body 130 is pivotally connected to the pivoting portion 141 of the support member 140, so as to allow one end of the support member 140 to be pivotally connected to a side edge of the third body 130, and a pivoting region (i.e., the pivoting portions 122, 132) of the second body 120 and the third body 130 is substantially away from a pivoting region of the support member 140 and the third body 130 (i.e., the pivoting portions 141, 131). Accordingly, when the third body 130 pivotally rotates relative to the first body 110 through the support member 140 (with the x-axis as a rotation axis), the support member 140 is simultaneously driven to slide along the rail 150 (back and forth along the x-axis).

Figure 4A:
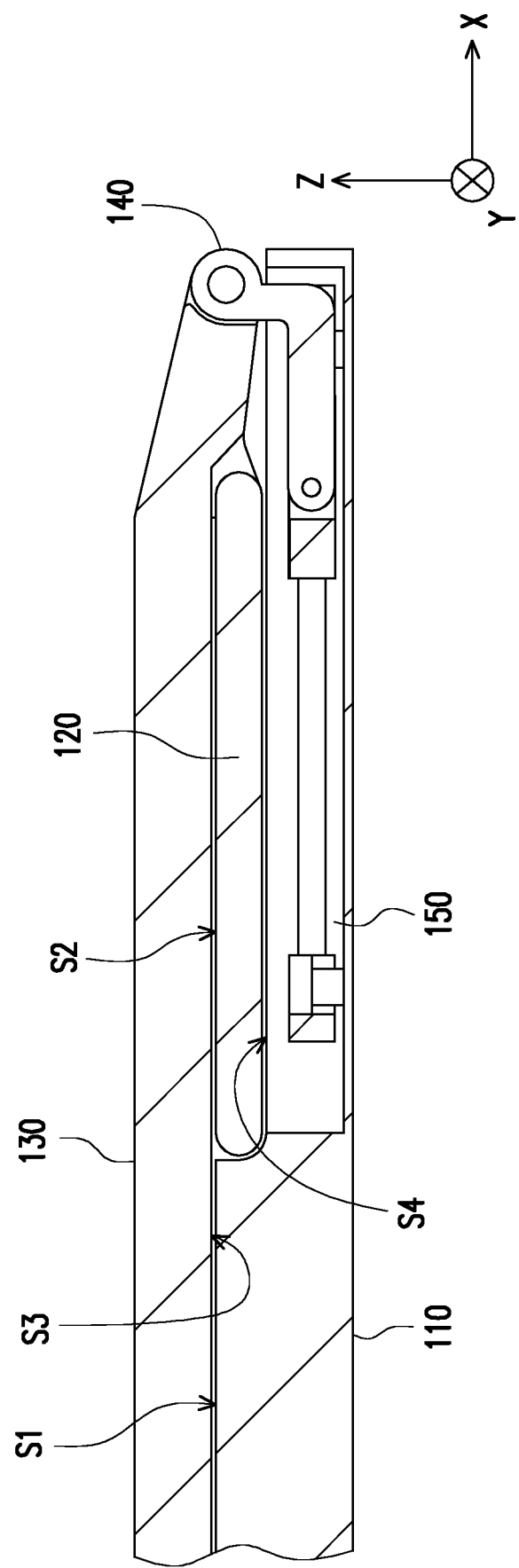
FIG. 4A and FIG. 4B are cross-sectional views of a portion of the portable electronic device in FIG. 1 in different states, respectively.
Figure 4B:
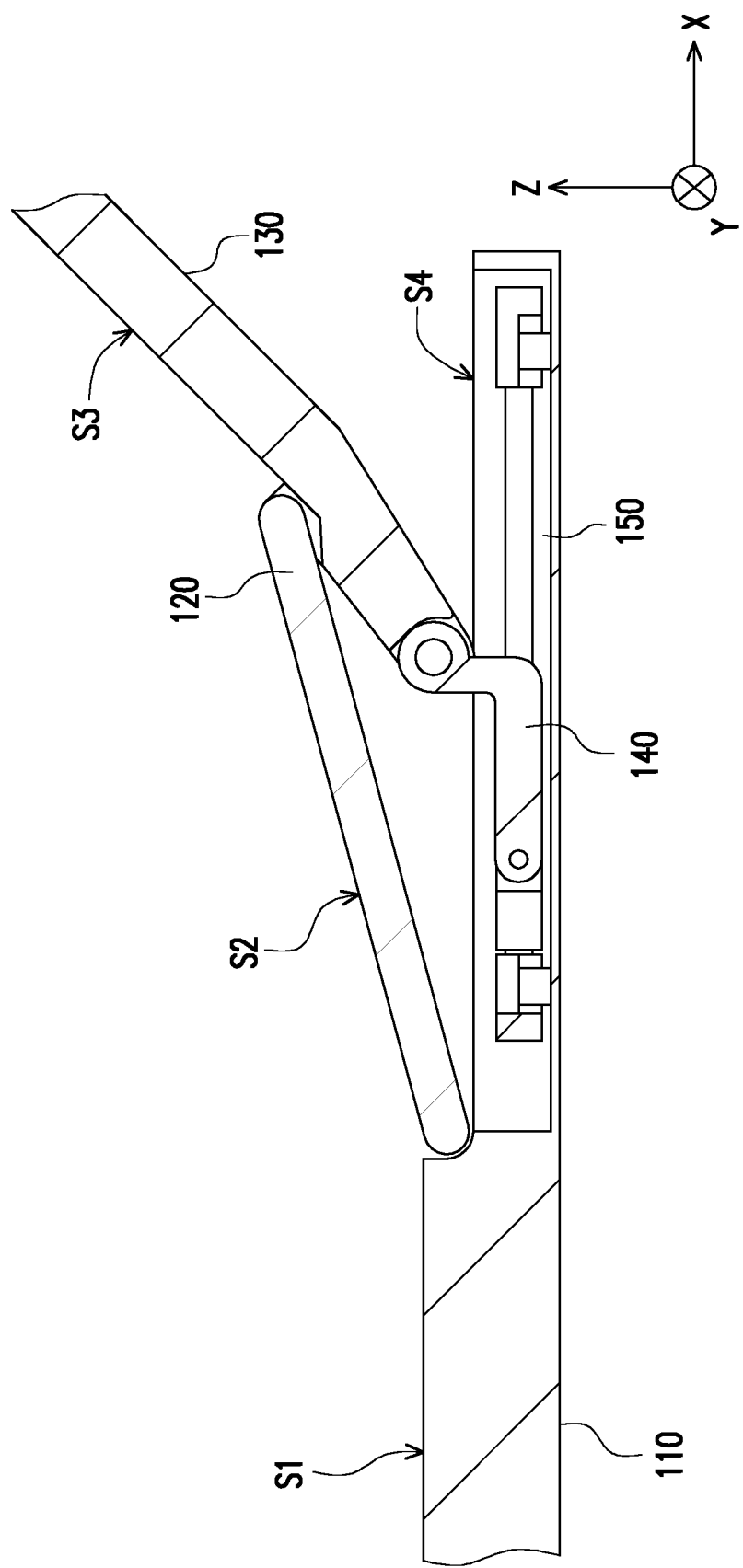

In particular, FIG. 4A and FIG. 4B are cross-sectional views of a portion of the portable electronic device in FIG. 1 in different states, respectively. With reference to FIG. 4A and FIG. 4B, in the embodiment, when the portable electronic device 100 is in the folded state shown in FIG. 4A, the input surface S1 and the first display surface S2 are located on the same plane, and the second display surface S3 overlaps and faces the input surface S1 and the first display surface S2. When the portable electronic device 100 is in the unfolded state shown in FIG. 4B, the first display surface S2 adjoins the input surface S1 and the second display surface S3, the second body 120 and the third body 130 are inclined relative to the first body 110, and a slope of the third body 130 with respect to the first body 110 is greater than a slope of the second body 120 with respect to the first body 110. At the same time, the pivotal rotation and the unfolding action of the third body 130 relative to the first body 110 further drives the support member 140 to move along the rail 150 toward the pivoting region of the second body 120 and the first body 110. On the contrary, when the portable electronic device 100 is changed from the state shown in FIG. 4B to the state shown in FIG. 4A, the support member 140 is restored to the original position again along the rail 150, so that the second body 120 is folded again and covered between the third body 130 and the first body 110.

Figure 5A:
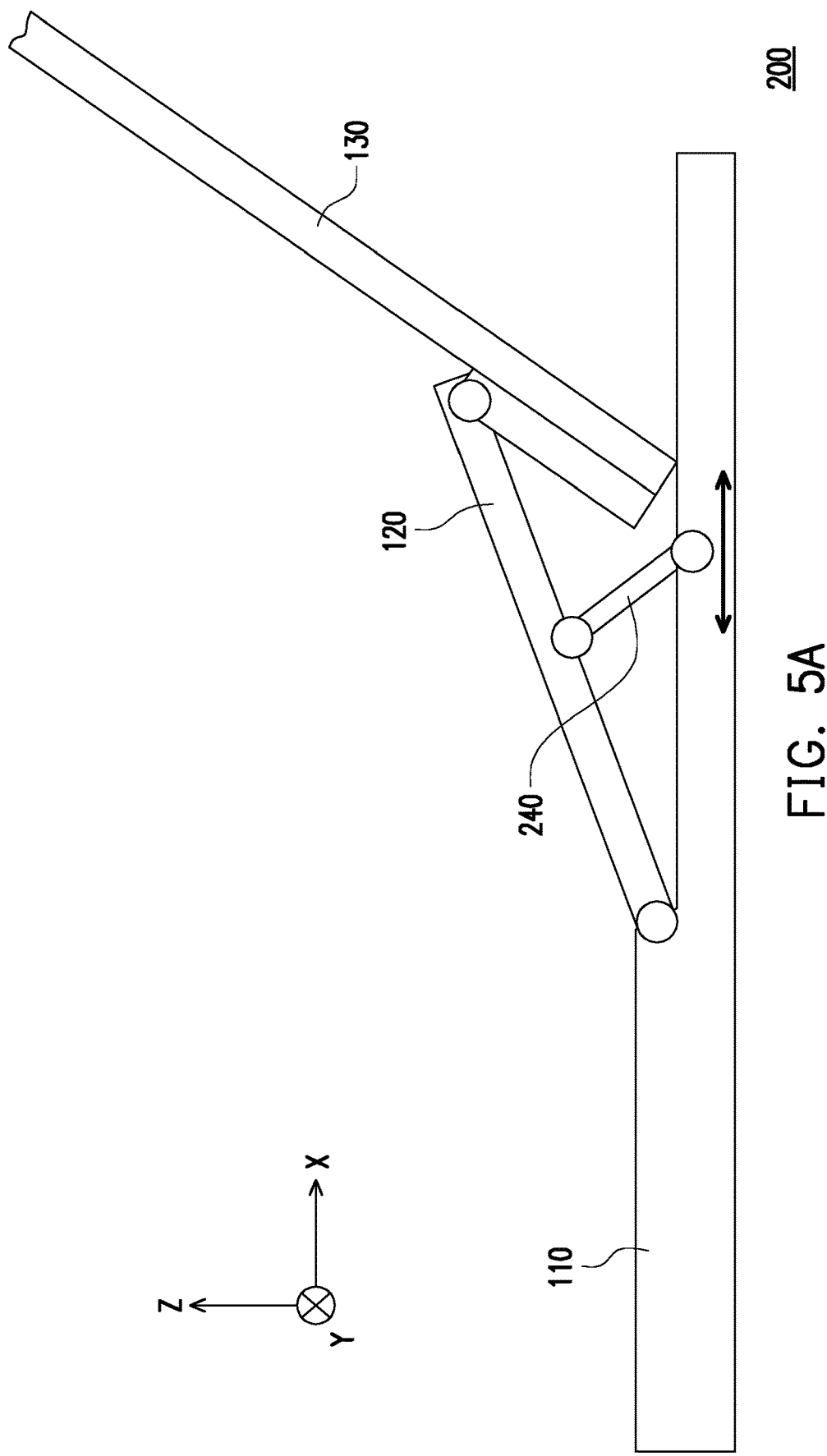
FIG. 5A and FIG. 5B are simple side views of a portable electronic device in different states according to another embodiment of the disclosure.
Figure 5B:
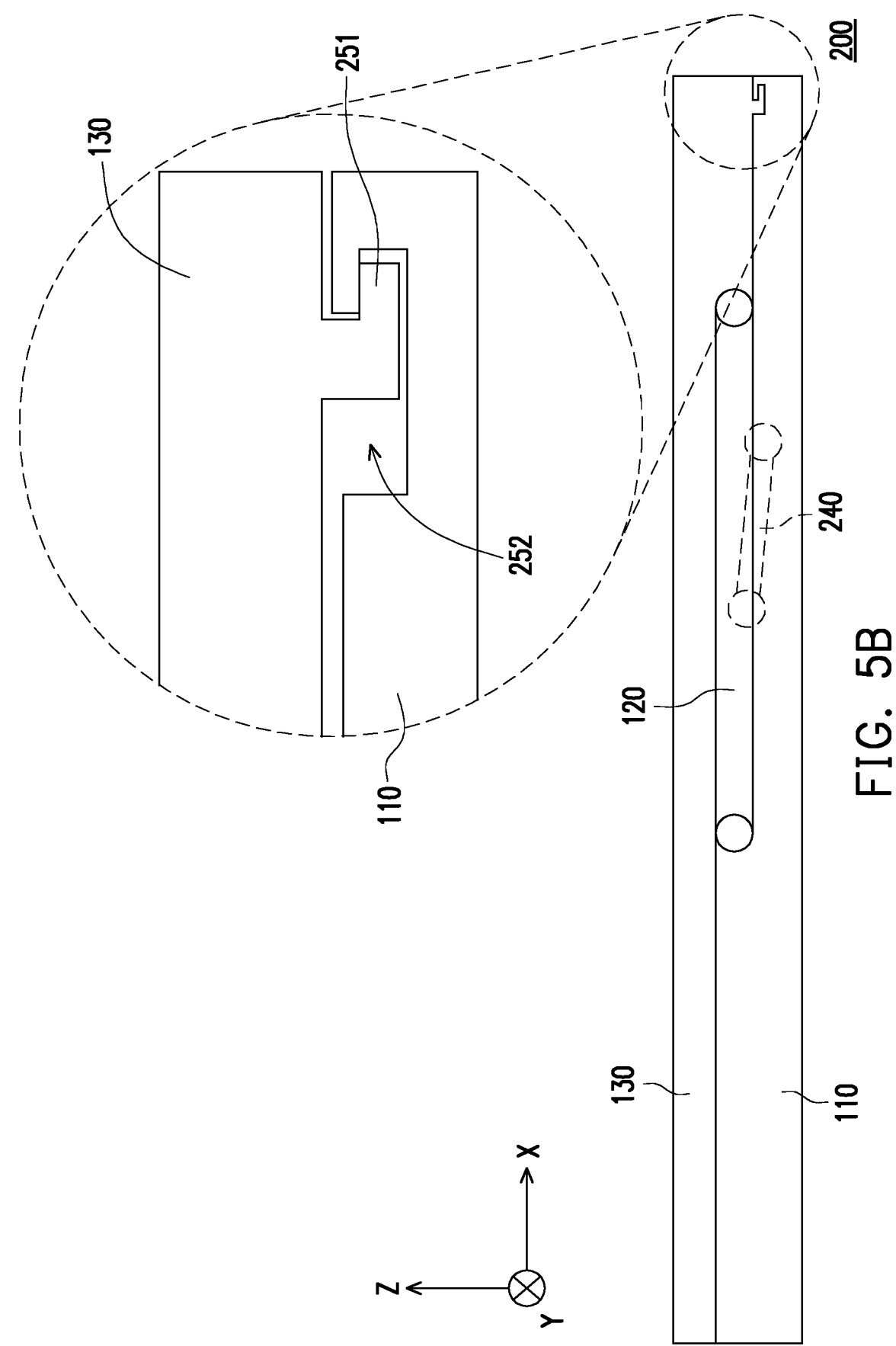

FIG. 5A and FIG. 5B are simple side views of a portable electronic device in different states according to another embodiment of the disclosure. With reference to FIG. 5A and FIG. 5B, in the embodiment, the portable electronic device 200 includes the first body 110, the second body 120, and the third body 130. If the reference numbers used herein are identical to those used in the foregoing embodiments, the components marked by the identical reference numbers have substantially the same structural features and will not be further described. Different from the foregoing embodiments, the portable electronic device 200 provided in the embodiment includes a support member 240, one end of which is pivotally connected to the second body 120, and the other end of which is slidably connected to the first body 110. That is, the pivoting region of the support member 240 and the second body 120 is located between the pivoting region of the second body 120 and the first body 110 and the pivoting region of the second body 120 and the third body 130.

Accordingly, in the folded state, the support member 240 is folded and covered between the second body 120 and the first body 110; in the unfolded state, since the support member 240 and the third body 130 have no structural connection relationship, the third body 130 is movably engaged to a different part of the first body 110, so as to adjust the slope of the third body 130 with respect to the first body 110 and the slope of the second body 120 with respect to the first body 110.

On the other hand, as shown in FIG. 5B, each of the first body 110 and the third body 130 of the portable electronic device 100 provided in the embodiment respectively has a latching portions 252, 251, for instance, and the latching portions are a latching slot located at the side edge of the first body 110 and a latching hook located at the side edge of the third body 130. Together with the third body 130, the latching hook may be moved away from or latched to the latching slot of the first body 110. Therefore, in the folded state, the first body 110 and the third body 130 are fixed together and stay folded by the latching portions 251 and 252 correspondingly latched to each other, so that the bodies of the portable electronic device 100 are not separated due to accidental touch. Note that the latching portions 251 and 252 described above are also applicable to the embodiments depicted in FIG. 1 to FIG. 4B.

To sum up, the portable electronic device provided in one or more embodiments of the disclosure has the multi-unit structure composed of its first body, second body, and third body pivotally connected to each other, and the supported member is movably disposed at the first body and pivotally connected to the second body or the third body as a support. Thereby, the multi-unit structure not only has the components pivotally rotated relative to each other but also has the improved support force required for operation through the support member. In other words, when the first body, the second body, and the third body are pivotally connected without any support member, the weight of the second body and the third body complete becomes the load of pivoting axles during pivotal rotation, which is apparently not conducive to the life span of the pivots; by contrast, when the support member is pivotally connected to the second body or the third body, the load of the pivoting axles may be effectively distributed to the first body through the support member, which may improve the operating efficiency of process of pivotally rotating and folding the portable electronic device and increase the service life of the components through distributing the load.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A portable electronic device, comprising: a first body; a second body, having two opposite sides and at first display surface; a third body, having a second display surface, wherein one of the two opposite sides of the second body is pivotally connected to and supported by the second display surface, the first display surface is adjacent to the second display surface, and the other one of the two opposite sides is pivotally connect to and supported by the first body; and a support member, movably disposed at the first body and pivotally connected to one of the second body and the third body, wherein in a folded state, the second body is folded and covered between the first body and the third body, and in an unfolded state, the second body and the third body are respectively inclined relative to the first body, and the second body is suspended over the first body; and wherein an area occupied by the second body is smaller than an area occupied by the third body.

2. The portable electronic device according to claim 1, wherein the first body has an input surface, in the folded state, the input surface and the first display surface are located at a same plane, and the second display surface overlaps and faces the input surface and the first display surface; in the unfolded state, the first display surface adjoins the input surface and the second display surface.

3. The portable electronic device according to claim 1, wherein in the unfolded state, a slope of the third body with respect to the first body is greater than a slope of the second body with respect to the first body.

4. The portable electronic device according to claim 1, wherein one end of the support member is pivotally connected to the second body, the other end of the support member is slidably pivoted to the first body, and in the unfolded state, the third body is movably engaged to the first body, so as to adjust a slope of the third body with respect to the first body and a slope of the second body with respect to the first body, respectively.

5. The portable electronic device according to claim 4, wherein a pivoting region where the support member and the second body are pivotally connected is located between a pivoting region where the second body and the first body are pivotally connected and a pivoting region where the second body and the third body are pivotally connected.

6. The portable electronic device according to claim 4, wherein in the folded state, the support member is folded and covered between the second body and the first body.

7. The portable electronic device according to claim 1, wherein one end of the support member is pivotally connected to a side edge of the third body, and a pivoting region where the second body and the third body are pivotally connected is away from the side edge.

8. The portable electronic device according to claim 7, wherein the first body has a recess, the portable electronic device comprises a rail disposed in the recess, and the support member is slidably disposed at the rail.

9. The portable electronic device according to claim 1, wherein each of the first body and the third body has a latching portion located at a side edge of the first body and at a side edge of the third body, and in the folded state, the pair of latching portions are latched to fix the first body and the third body together and maintain the folded state.

* * * * *